US011508008B2

(12) United States Patent
Nunes (10) Patent No.: US 11,508,008 B2
(45) Date of Patent: *Nov. 22, 2022

(54) APPARATUS AND METHODS FOR DETECTION, MONITORING, AND DELAY IN A COMPUTER NETWORK (71) Applicant: Nasdaq, Inc., New York, NY (US)

(72) Inventor: Adam Seth Nunes, Brooklyn, NY (US)

(73) Assignee: Nasdaq, Inc., New York, NY (US)

( * ) Notice: Subject to any disclaimer, the term of this patent is extended or adjusted under 35 U.S.C. 154(b) by 23 days.

This patent is subject to a terminal disclaimer.

(21) Appl. No.: 17/060,228

(22) Filed: Oct. 1, 2020

(65) Prior Publication Data

US 2021/0019828 A1    Jan. 21, 2021

Related U.S. Application Data (63) Continuation of application No. 15/882,243, filed on Jan. 29, 2018, now Pat. No. 10,810,669, which is a continuation of application No. 12/035,748, filed on Feb. 22, 2008, now abandoned.

(51) Int. Cl.
G06Q 40/04 (2012.01)
(52) U.S. Cl.
CPC .................... G06Q 40/04 (2013.01)
(58) Field of Classification Search
None
See application file for complete search history.

(56) References Cited

U.S. PATENT DOCUMENTS

| | | | |
|---|---|---|---|
| 6,016,483 A | 1/2000 | Rickard | |
| 6,505,174 B1 | 1/2003 | Keiser et al. | |
| 6,618,707 B1 * | 9/2003 | Gary | G06Q 40/00 705/36 R |
| 7,103,569 B1 | 9/2006 | Groveman | |
| 7,110,981 B1 | 9/2006 | Sidikman | |
| 7,356,499 B1 * | 4/2008 | Amburn | G06Q 10/087 705/37 |
| 7,577,608 B1 | 8/2009 | Mintz | |
| 7,613,647 B1 | 11/2009 | Cushing | |
| 7,827,087 B2 | 11/2010 | Adatia | |
| 8,140,425 B2 | 3/2012 | Hiatt, Jr. | |
| 8,165,954 B2 * | 4/2012 | Waelbroeck | G06Q 30/0239 705/37 |
| 8,660,936 B1 * | 2/2014 | Banke | G06Q 40/04 705/37 |
| 8,751,352 B2 | 6/2014 | Kadlec | |
| 10,055,788 B1 | 8/2018 | Tatang | |
| 2001/0042036 A1 | 11/2001 | Sanders | |

(Continued)

OTHER PUBLICATIONS

Cochran, S. J., & Mansur, I. (2002). Stock market volatility. Journal of Financial Service Professionals, 56(1), 82-89. Retrieved from https://dialog.proquest.com/professional/docview/209615480?accountid=131444 on Jun. 28, 2022 (Year: 2002).*

(Continued)

*Primary Examiner* — Kito R Robinson
(74) *Attorney, Agent, or Firm* — Nixon & Vanderhye P.C.

(57) ABSTRACT

Computing apparatus detects and monitors rapid changes in a computer network. The computing apparatus implements delays and other actions to ameliorate potentially adverse effects in the computer network caused by such changes.

20 Claims, 6 Drawing Sheets

(56) References Cited

U.S. PATENT DOCUMENTS

| | | | |
|---|---|---|---|
| 2002/0133449 A1 | 9/2002 | Segal | |
| 2002/0138401 A1 | 9/2002 | Allen | |
| 2002/0156716 A1 | 10/2002 | Adatia | |
| 2003/0055768 A1 | 3/2003 | Anaya | |
| 2003/0126066 A1 | 7/2003 | Nunes et al. | |
| 2004/0039673 A1 | 2/2004 | Amberson | |
| 2005/0246261 A1 | 11/2005 | Stevens | |
| 2005/0283421 A1 | 12/2005 | Hatheway et al. | |
| 2006/0031156 A1 | 2/2006 | Noviello | |
| 2006/0206404 A1 | 9/2006 | Hatheway et al. | |
| 2008/0046356 A1 | 2/2008 | Farrell | |
| 2008/0059356 A1 | 3/2008 | Brodsky | |
| 2014/0172662 A1* | 6/2014 | Weiss | H04L 43/0864 705/37 |
| 2016/0196606 A1* | 7/2016 | Damodaran | G06Q 40/06 705/37 |

OTHER PUBLICATIONS

Market Volatility and Web Brokerages. (1999). Financial Net News, 4(9), 9(1). Retrieved from https://dialog.proquest.com/professional/docview/1079823978?accountid=131444 on Jun. 28, 2022 (Year: 1998).*

U.S. Appl. No. 12/035,748, filed Feb. 22, 2008, Inventor: Nunes.
Decision on Appeal dated Nov. 30, 2017 in U.S. Appl. No. 12/035,748 (13 pages).
Examiner's Answer dated Jan. 22, 2016 in U.S. Appl. No. 12/035,748 (7 pages).
Final Office Action dated May 5, 2015 in U.S. Appl. No. 12/035,748 (8 pages).
Office Action dated Oct. 17, 2014 in U.S. Appl. No. 12/035,748 (7 pages).
Office Action dated Apr. 7, 2014 in U.S. Appl. No. 12/035,748 (9 pages).
Office Action dated Jul. 29, 2013 in U.S. Appl. No. 12/035,748 (11 pages).
Final Office Action dated Dec. 22, 2010 in U.S. Appl. No. 12/035,748 (12 pages).
Office Action dated Jul. 12, 2010 in U.S. Appl. No. 12/035,748 (12 pages).
U.S. Appl. No. 15/882,243, filed Jan. 29, 2018, Inventor: Nunes.
Office Action dated Nov. 21, 2019 in U.S. Appl. No. 15/882,243 (29 pages).
Kelly, S. (Sep. 18, 1992). Volatility subsides as traders pause after Wednesday's wild trading, The Bond Buyer Retrieved from https://dialog.proqnest.com/professional/docview/4073836537accountid+131444 on Jun. 11, 2020 (Year: 1992) 7 pages.

* cited by examiner

APPARATUS AND METHODS FOR DETECTION, MONITORING, AND DELAY IN A COMPUTER NETWORK

CROSS-REFERENCE TO RELATED APPLICATIONS

This application is a continuation of U.S. application Ser. No. 15/882,243, filed Jan. 29, 2018, which is a continuation of U.S. application Ser. No. 12/035,748, filed Feb. 22, 2008, the entire contents of each of which are incorporated herein by reference.

BACKGROUND

Electronic equity markets collect, aggregate and display trade information to market participants. Market participants initiate trades of securities by sending trade information to the electronic market on which the securities are traded. The trade information includes continuous orders for execution during a market trading session.

A halted security is a previously traded security for which no trading occurs for a defined period of time. Halts are ordered by a market regulator or are otherwise operationally initiated. For example, Market Watch monitors securities and based on the new dissemination of information may order a halt. An initial public offering (IPO) issue is an initial offering of shares of a security to the public. In some examples, an initial public offering is done on an exchange but this need not necessarily be the case. For an IPO issue, trading commences at the time of the IPO. A halt cross is a process for determining the price for which a security is executed at the opening of trading for a halted security or for an IPO issue.

SUMMARY

Before a security is released for trading, the volatility in prices of quotations for the security is determined and the security is released for trading when the determined volatility is below a threshold. The release of the security is delayed if the detected volatility in the security's price quotations exceeds the threshold. Additionally, volatility is detected in prices of quotations for an initial public offering issue before the issue is released for trading. The time for volatility detection is extended if the detected volatility exceeds the threshold and volatility is detected over a period of time. At the end of this period of time, the security is released if volatility is less than the threshold.

In some examples, the volatility is calculated as a variance in the prices of quotations for the security. The variance is measured as a percentage value or in absolute terms. The variance in the price quotations of the security prior to the release of the security is calculated at discrete intervals until the variance is less than the threshold.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
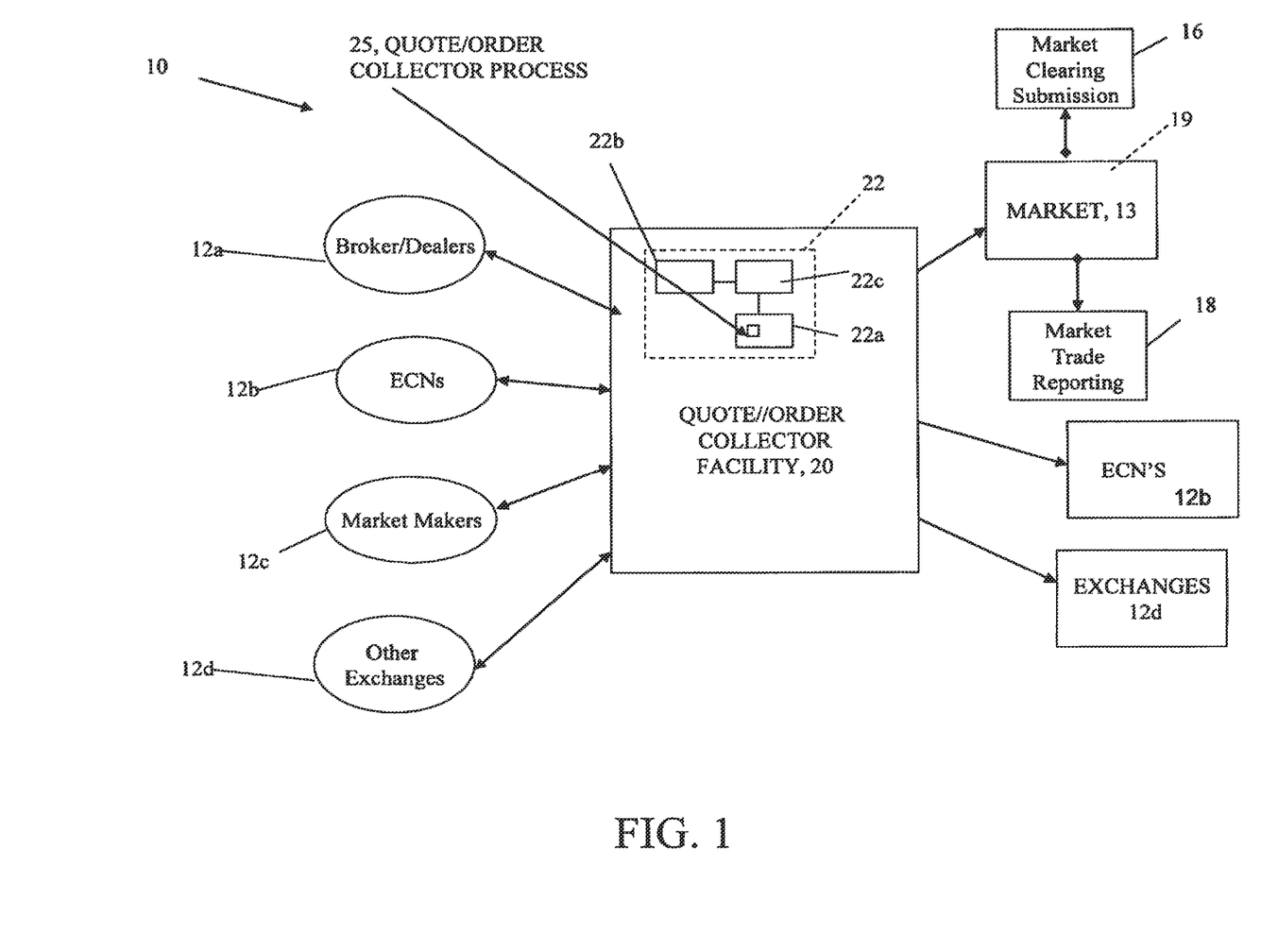
FIG. 1 is a block diagram of a market system.

Referring to FIG. 1, an electronic market 10 is shown as an example of a trading platform. Numerous other trading platforms are used, including platforms that facilitate trading in markets and exchanges. The electronic market 10 includes client systems 12 that access a central quote/order collector facility 20. In some examples, the client systems 12 are broker/dealer systems 12a, electronic communication networks (ECN's) 12b, market-maker(s) system(s) 12c, and other exchanges 12d. In one example, the connections use Nasdaq® protocols such as SelectNet® and Small Order Execution System.® (SOES®) The client systems 12 include a processor, memory and a storage device, e.g., a client workstation or personal computer (all not shown) that can include a client process to enter quotes/orders into the electronic market systems (e.g., SOES® and SelectNet®) to deliver executions or orders to a market that is coupled to a clearing system 16 and a reporting system 18. It also causes delivery of executions or routing of orders to the ECN's 12b, depending on the status of the ECN, and routing of orders to other markets and exchanges 12d. The quote/order collector facility 20 is comprised of one or preferably a plurality of server computers generally denoted as 22 including a processor 22a, main memory 22b and storage 22c. The storage system 22c includes quote/order collector process 25 that is executed in memory 22b.

The quote/order collector facility (OCF) 20 collects pre-trade information in the form of quotes or orders. The distinction between a quote and an order depends on several factors. For example, each market maker typically sends a two-sided proprietary quote, i.e., a quote that represents its own trading interest for both buy and sell sides of a market, or an agency quote that represents trading interest of a sponsored entity. If one proprietary quote of a sponsored entity is sent it could be considered one order. If one agency quote is sent it also could be considered one order. If an agency quote reflects an aggregation of more than one agency order, however, the aggregate agency order is considered a quote. Entering quotes are limited to registered market makers 12c and ECNs 12b and possible UTP Exchanges 12d.

For any given stock, a registered market maker or ECN directly enters a non-marketable order i.e., quote into the quote/order collector facility (OCF) 20 on behalf of its customer account, or it sponsors the direct entry of an order by its customer. All sponsored quotes are sent to the quote/order collector facility 20 under the name of the sponsoring market maker or ECN. In some embodiments, registered market makers or ECNs are permitted to submit an unlimited number of non-marketable quotes to the system 20.

The quote/order collector facility 20 receives quotes, liability orders, (non-liability orders) and directed orders from market participants. The quote/order collector facility 20 allows a quote/order to be displayed in the market, and also allows for marketable orders to be executed or routed to market participants.

Figure 2:
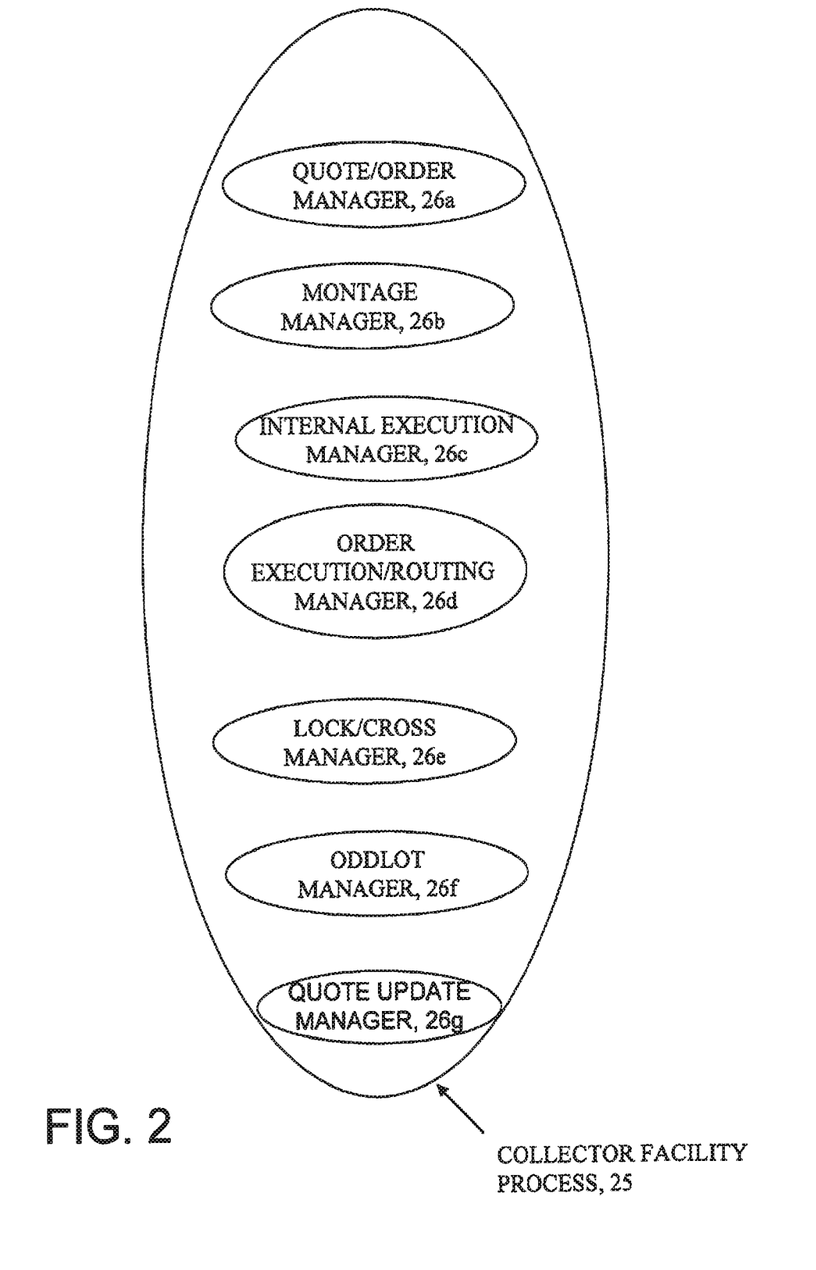
FIG. 2 is a logic view of functions in the in the Quote/Order Collector Facility.

Referring to FIG. 2, the quote/order collector process (OCP) 25 is shown. The quote/order collector process 25 provides transmission of multiple orders or quotes at multiple price levels by Quoting Market Participants to a quotation manager 26*a*. The quote/order manager 26*a* provides a unified point of entry of quotes and orders from disparate delivery systems into the quote/order collector facility 20 to access quotes/orders displayed (as either attributable or non-attributable) in both the aggregate montage and current quote montage. The quote/order manager 26*a* manages multiple quotes/orders and quotes/orders at multiple price levels and uses a montage manager 26*b* to display (either in the Aggregate montage or in the current quote montage) the orders/quotes consistent with an order's/quote's parameters. The order collector process 25 also includes an internal execution process manager 26*c* to match off executions for quoting market participants at the best bid/offer. The order collector system 20 also includes an order routing/execution manager 26*d* to provide a single point delivery of executions or routing of orders, which substantially eliminates potential for dual liability. That is, order collector process 25 maintains the order routing and executions functionality available in the SOES® and SelectNet® systems.

The order collector process 25 also includes a lock/cross manager 26*e*, and an odd lot execution manager 26*f* and a quote update manager 26*g*.

Figure 3:
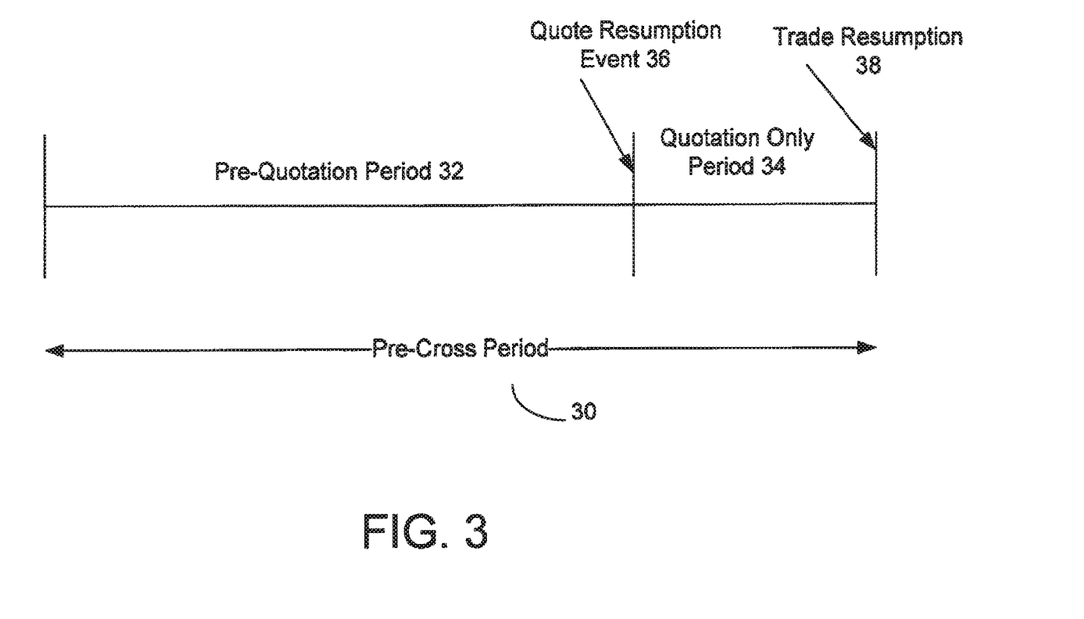
FIG. 3 is a diagram of a Pre-Cross Period.

The Quote/Order Collector Facility 20 collects quotes and orders during a period of nontrading, referred to as the Pre-Cross Period 30, as illustrated in FIG. 3. During the times that the markets are open, securities, such as halted securities and IPO issues, are not traded for numerous reasons. In the case of a halted security, trading is halted when marketplace events cause volatility in the security's price, resulting in a trading halt. During the trading halt, price quotations and orders of the security are not generally monitored to calculate their volatility. However, monitoring is resumed during the Quotation Only Period, occurring towards the end of the Pre-Cross Period 30. When the level of volatility is acceptable, the security is released and trading resumes. Trading halts prevent large fluctuations in the security's price, allowing the security's price to remain stable during trading. For example, Federal Drug Administration (FDA) approval of a company's product causes volatility in the company's securities due to increased demand for the securities initially after announcement of the approval. Then, as the market absorbs the announcement, demand for the security drops, causing the security's price to settle at a lower range. Therefore, trading will be halted during the period of volatility. In this example, if the FDA makes its announcement at 8:15 am, a trading halt for that company's security could occur between 8 am and 10 am, if the market is able to fully absorb the announcement in two hours such volatility will have ceased upon trade resumption.

After a trading halt, the price at which the security opens is determined by a halt cross process. The halt cross process determines the security's equilibrium, re-opening price by calculating an intersection of the security's price quotation demand curve with its quotation supply curve.

In the case of an IPO issue, the halted security process is replicated except that the IPO issue is not halted, because it has not yet begun trading. Therefore, instead of monitoring quotations for the security during the halt period, quotations for the IPO issue are monitored prior to the IPO release. This is done to ensure that once released, the IPO issue is stable and not subject to price volatility. An IPO cross determines the price at which the IPO issue opens using the procedure described above. Hereafter, the term Halt Cross to refers to a cross that takes place for both a halted security and an IPO issue.

Referring to FIG. 3, in some embodiments, for either a halted security or an IPO issue, the Pre-Cross Period 30 has at least three components: (1) the Pre-Quotation Period 32; (2) the Quotation Only Period 34; and (3) Trade Resumption 38. In the case of a halted security, the Pre-Quotation Period 32 is sometimes referred to as the Halt Period, because trading is ceased (i.e. "halted") during this time.

During the Pre-Quotation Period 32, the entry of quotations and orders is prohibited. During the Quotation Only Period 34, quotes and orders are entered, entered quotes and orders are cancelable, and an indicative crossing price and imbalance information are disseminated, but no executions occur. An event, referred to as the Quote Resumption Event 36, triggers the start of the Quotation Only Period 34 by communicating with a trading platform when the appropriate time for quote resumption arrives. The Quote Resumption Event 36 specifies the time during the Pre-Cross Period 30 that the trading platform begins accepting quotations and orders. In some embodiments, the Quote Resumption Event 36 is measured with reference to the Pre-Cross Period 30, such as 5 minutes after the beginning of the Pre-Cross Period 30, or at a fractional point in time, such as after ⅔ of the Pre-Cross Period 30 has elapsed. In some examples, the time set for the Quote Resumption Event 36 depends on numerous factors and whether an IPO issue or halted security is being released. For a halted security, the time of news dissemination, the nature of the disseminated news such as its subject matter or whether it concerns a complex matter, and the amount of time necessary for analysts and other market participants to consume the information factor into the determination of the Quote Resumption time. For an IPO issue, factors such as market health, potential market hostility to the IPO issue, the amount of time an underwriting syndicate requires to determine an IPO price, and the time of the day during which an IPO can occur determine the Quote Resumption time.

With the start of the Quotation Only Period 34, the market participants receive a message, alerting them to the platform's acceptance of quotations and orders. In some examples, the Quotation Only Period 34 for IPO issues and halted securities differs. In some examples, the Quotation Only Period 34 for IPO issues is 15 minutes and for halted securities is 5 minutes. In some embodiments, quotations and orders placed during the Quotation Only Period 34 are collected and stored in the quote/order collector facility 20.

The time at which a halted security or an IPO issue resumes or begins trading is referred to as Trade Resumption 38. Trade Resumption 38 marks the end of the Pre-Cross Period 30, because once the security begins trading it is no longer in a halted or IPO state. The time for Trade Resumption 38 is determined by numerous factors and is variable. In some examples, Trade Resumption 38 occurs at a predefined period of time after Quote Resumption and varies based on the type of security, such as a halted one or an IPO issue. However, such variation need not occur. In some examples, time for Trade Resumption 38 is generated automatically based on automatic monitoring of market conditions. In other examples, it is manually calculated and entered into the trading platform. Additionally, for either a halted security or an IPO issue, price volatility and an imbalance of shares in an IPO/Halt cross delays the time for Trade Resumption.

For a halted security, in one example, the time set for Trade Resumption is 5 minutes after Quote Resumption.

However, other Trade Resumption times exist if more or less time accurately reflects the length of time for volatility to subside. In the above FDA example, the pharmaceutical company decides that 30 minutes is an appropriate length of time to allow the market to absorb the new information. Therefore, Trade Resumption 38 has a value of either 8.30 am or 30 minutes after the halt began. For an IPO issue, in one example, the trading begins 15 minutes after Quote Resumption, because this is sufficient time to accurately assess an IPO's volatility. However, other factors affect the Trade Resumption time such as whether an underwriter determines that a delay is necessary or price dislocation has occurred. Additionally, in one IPO example, the issuer of the IPO, such as an investment bank or the underlying company, determines the Trade Resumption time.

Trading resumes when real time equals the time specified for Trade Resumption 38. In some examples, a Trade Resumption 38 event communicates with the trading platform that trading should begin and the platform sends a message to market participants signaling the resumption of trading.

At the end of the Quotation Only Period 34, the trading platform performs a volatility analysis based on all quotes and orders entered for the halted security or the IPO issue, calculating the equilibrium price for buy and sell quotations at varying points of time during the Quotation Only Period 34. This volatility analysis determines whether the halted security of IPO issue resumes or begins trading. Volatility is detected through calculations based on data contained in an electronic message referred to as the Net Order Imbalance Indicator (NOII). During the Quotation Only Period 34, the NOII is generated and contains information about the halted security or IPO issue, such as paired volume, imbalance volume, the far indicative opening price and the near indicative opening price, as shown in Table 1 and Table 2 (below). The NOII is disseminated to NADAQ members, service bureaus and data vendors, who redistribute the information to their customers and broker dealers. The frequency of the NOII's dissemination is predefined. In one example, the NOII is disseminated every five seconds. However, its dissemination frequency varies based on the amount of time market participants require to react to the information. For example, if the market is largely electronic, then the reaction time to such information is small and market participants can consume frequent dissemination of information. Conversely, if the market is largely non-electronic, then participants require more time to consume information and therefore frequent dissemination of information is not properly consumed.

In some examples, the NOII for the Halt Cross is disseminated every five seconds throughout the Quotation Only Period 34 by NASDAQTRADER.com, NASDAQ Total View and the NASDAQ application programming interface. The NOII for the Halt Cross contains data elements reflecting the current state of the market leading into the Cross.

Table 1 below shows an exemplary IPO/Halt Net Order Imbalance Indicator Message Format. The Halt Cross data elements reflect the current state of the market. These elements include (1) the Inside Match Price, which is the price at which the maximum number of shares of eligible quotes and orders are paired; (2) the number of shares represented by eligible quotes and orders that are paired at the Inside Match Price; (3) the number of shares in any imbalance at the Inside Match Price; and (4) the buy/sell direction of that imbalance at the Inside Match Price.

TABLE 1

| Cross Type | Issue Symbol | Number of Paired Shares | Number of Shares of Imbalance | Imbalance Side |
|---|---|---|---|---|
| Inside Match Price | Far Indicative Clearing Price | Near Indicative Clearing Price | No Indicative Clearing Price | Price Variation Indicator |

In one example, table 2 below depicts details of the NOII that contains an indicative clearing price range at which the Halt Cross would occur if the Halt Cross were to occur at that time. The two indicative prices in that range and the Inside Match Price have identical values because, in the absence of order types unique to the IPO and Halt Cross, the Inside Match Price and indicative price range are calculated based upon the same order set, resulting in the same price output. Table 2 depicts an exemplary IPO/Halt Order Imbalance Indicator Message Dissemination Record.

TABLE 2

| Field | Format | Description | Code | Value |
|---|---|---|---|---|
| Cross Type | 1 byte Alphanumeric | This 1-byte alphanumeric field will denote the type of NASDAQ cross event for which the NOII message is being generated. | O | Regular Opening Cross |
| | | | I | Intra-day Opening for Single Security (IPO and Halt Situations) |
| | | | C | Regular Closing Cross |
| Issue Symbol | 7 bytes, Alphanumeric. | The Issue Symbol field identifies the symbol assigned by NASDAQ for a given security. | | |
| Number of Shares Paired | 12 bytes, Numeric. | This field indicates the total number of shares that are currently eligible to be matched at the Inside Match Price. | | |
| Number of Shares of Imbalance | 12 bytes, Numeric. | This field will only be populated when there is a Market Buy or Market Sell condition, indicating that there are unexecutable Market Priced shares on one side or the other. If all Market Priced shares will be executed, this field will be zero as defined by the Imbalance Shares Computation section below. | | |

TABLE 2-continued

| Field | Format | Description | Code | Value |
|---|---|---|---|---|
| Imbalance Side | 1 byte, Alphanumeric. | This field indicates the market side of the imbalance. The allowable values are as follows: | B<br>S<br>N<br>O | Buy Side Imbalance<br>Sell Side Imbalance<br>No Imbalance<br>No marketable Orders in SuperMontage, thus no imbalance. |
| Inside Match Price | 10 bytes, Numeric. | This field indicates the NASDAQ Inside Price at which the Number of Paired Shares and the Number of Shares of Imbalance were calculated, this price will be identical to the Near and Far Indicative Clearing Prices. | | |
| Far Indicative Clearing Price | 10 bytes, Numeric. | This field indicates the price level at which the order book would clear based on the current quotes and orders. The format of will be $$$$$.dddd. | | |
| Near Indicative Clearing Price | 10 bytes, Numeric. | This field indicates the price level at which the order book would clear based on the current quotes and orders. The format of will be $$$$$.dddd. | | |
| No Indicative Clearing Price | 1 byte; Alphanumeric. | This field indicates when Market orders cannot be fully paired against offsetting orders at either the Near Indicative Clearing Price or the Far Indicative Clearing Price. The allowable values are as follows: | B<br>A<br>Space | Market Buy<br>Market Sell<br>Not applicable, Indicative Clearing Prices are present |
| Price Variation Indicator | 1 byte, Alphanumeric | Indicates the absolute value of the percentage of deviation of the Near Indicative Price to the projected Inside Match Price. Since there is no difference between Inside Match Price and the Near Indicative Price, this indicator cannot be accurately calculated. | Code<br><br>Space | Value<br><br>Price Variation Indicator cannot be calculated |

The NOII disseminated prior to the Halt Cross differs in several ways from those disseminated prior to the Opening and Closing Crosses, as described in U.S. patent application Ser. No. 11/077,503 pertaining to opening crosses in an electronic market and U.S. patent application Ser. No. 10/835,510 pertaining closing crosses in an electronic market. The Halt Cross NOII is based on different order types. The NOII for the Opening and Closing Crosses include information about On Open and On Close order types, in addition to quotations and regular and extended hours orders for each time in force (Total Day, Day, Good-till-Canceled, and Immediate or Cancel). The NOII for the Halt Cross includes quotations, regular hours orders, and extended hours orders. The NOII for the Halt Cross disseminates the same value for the Inside Match Price, Near Indicative Clearing Price and Far Indicative Clearing Price. The Inside Match Price is the price at which the Number of Paired Shares and the Number of Shares of Imbalance are calculated, and is discussed further below. The Far Indicative Clearing Price and the Near Indicative Opening Price are the clearing prices for all orders in the book at a moment in time. That is, unlike during opening and closing of trading, during a trading halt, there is no firm inside quotation (firm bid and firm offer prices) and the inside can be locked (the bid being equal to the offer) or crossed (the bid being higher than the offer). In addition, the Halt Cross does not include On Open and On Close orders. On Open and On Close orders are available to absorb liquidity during the Opening and Closing Crosses and do affect the Near and Far Indicative Clearing Price data elements prior to the Opening and Closing Crosses. Due to these differences, calculating the Near and Far Indicative Clearing Prices provides ambiguous data. Thus, Near and Far Indicative Clearing Price fields are disseminated with identical values to the Inside Match Price in order to avoid requiring market participants to re-program their systems to accept a different NOII.

The Inside Match Price (and thus the Near and Far Indicative Clearing Prices) are calculated as follows. The system determines the price(s) that maximize the number of shares paired. If more than one such price exists, the system selects the price that minimizes the imbalance of shares unpaired, and that does not leave unexecuted shares at a superior price. If more than one price satisfies both conditions, the type of trading halt necessitating the Halt Cross, such as an IPO, is determinative. When the Halt Cross is for an IPO halt, if more than one such price satisfies the above conditions, the system selects the price that minimizes the price differential from the Issuer's Initial Public Offering price, which is found in the previous day's close field. For any other halt, if the stock has already been opened for that day and more than one price satisfies the above conditions, the system selects the price that minimizes the price differential from the last market center execution prior to the halt. If the security has not been opened for that day yet and more than one such price exists, the system selects the price that minimizes the price differential from the previous Official Closing Price.

Figure 4:
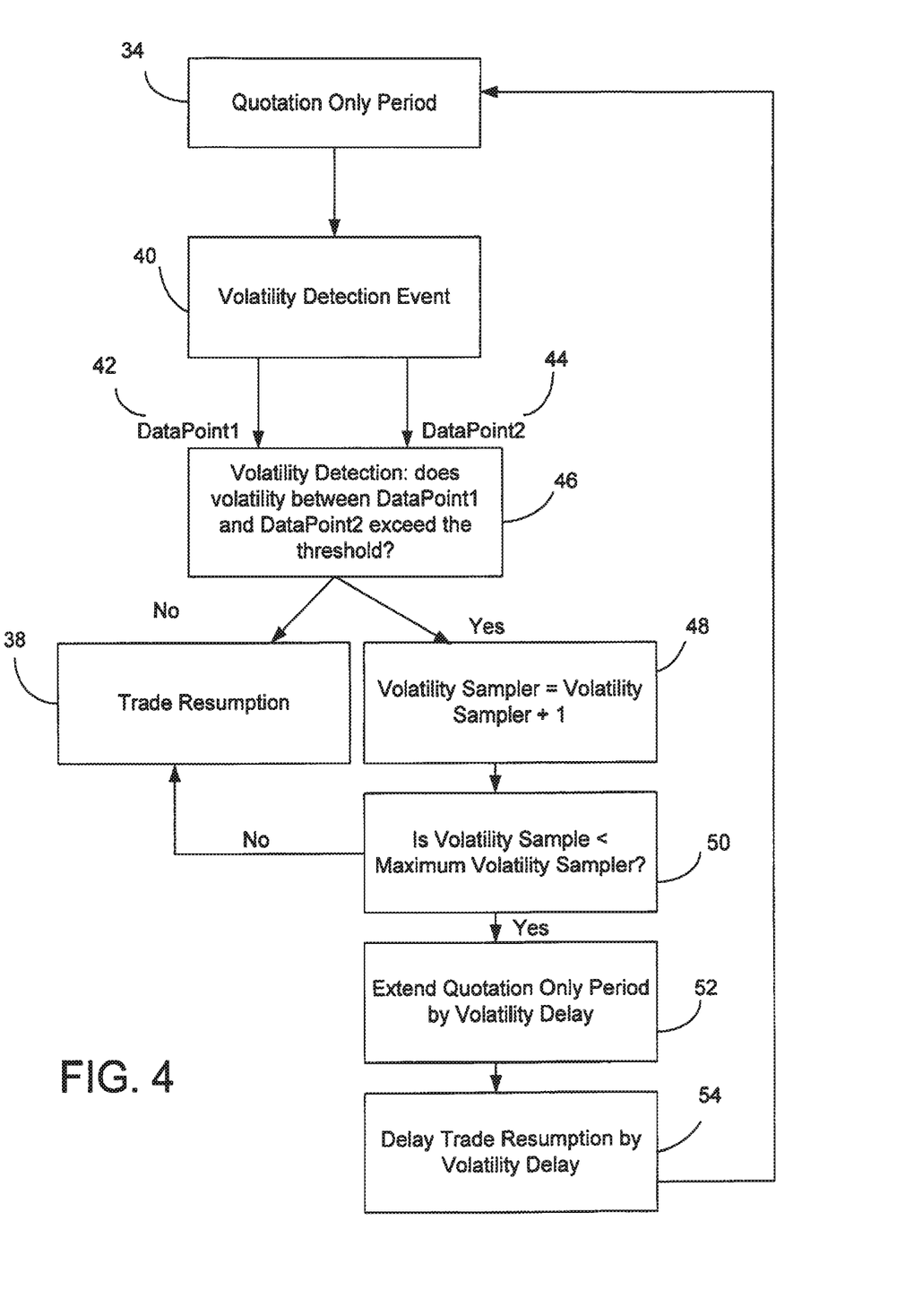
FIG. 4 is a block diagram of the volatility detection process.

Referring to FIG. 4, in order to facilitate the orderly opening of a halted security or IPO issue, the volatility in its price quotations are monitored and Trade Resumption 38 occurs when the volatility reaches an acceptable level. Numerous computing environments support such volatility detection and monitoring, such as the computing environment illustrated in FIG. 6. Therefore, the volatility of the security's price quotations are measured against a specified threshold 46, and Trade Resumption 38 is delayed if volatility exceeds the threshold 54. The volatility detection and delay are based upon the data contained in the NOII, which is disseminated every five seconds throughout the Quotation Only Period 34.

Volatility detection occurs during the Quotation Only Period 34. In some examples, volatility detection takes place at a time closely preceding the time for Trade Resumption 38. An event referred to as the Volatility Detection Event 40 is programmed with the time that volatility detection begins. Volatility detection starts when real time equals the value of the Volatility Detection Event 40. In some examples, the Volatility Detection Event 40 has a value of, e.g., five seconds prior to the time scheduled for Trade Resumption 38. Because volatility is calculated by examining the value of data points 42, 44 at varying times during the Quotation Only Period 34, the Volatility Detection Event 40 also sets the times for sampling of data points 42, 44. In some examples, these times are defined with reference to the time for Trade Resumption 38. In some embodiments, the data points are the Inside Match Prices disseminated every five seconds with the NOII and the Volatility Detection Event 40 specifies which Inside Match Prices are sampled. Therefore, in this example, the Volatility Detection Event 40 specifies the data points are the Inside Match Price from the third to last NOII before Trade Resumption 38 (T−15 seconds to Trade Resumption) and the Inside Match Price from the NOII immediately prior to Trade Resumption 38 (T−1 seconds to Trade Resumption).

Volatility of price quotations of the security is calculated by determining the price differential in the security's price quotations between the two data points 42, 44. In some examples, the price differential is calculated as a percentage value or as an absolute value. The price differential is compared to a threshold value indicative of an acceptable level of volatility in the price quotations. In some examples, the threshold is a predetermined absolute price change or a percentage variance, such as 10% or 50 cents. The threshold is adjustable based on numerous market conditions such as large point drops in indices and overall market volatility. In some examples, after a threshold adjustment, market participants are notified, allowing them to gauge the relative stability of stock after it has opened. In one example, market participants are notified using email alert systems. However, the amount of the threshold adjustment need not be listed in the email. Instead, exchange associates could communicate the threshold adjustment directly to market participants. If the price differential exceeds the threshold value, the halted security's or IPO issue's price quotations are too volatile and trading does not resume. Instead, the halt is prolonged and the Trade Resumption 38 is delayed 54 to allow monitoring of the quotations of the security over an extended period of time until volatility has dropped to an acceptable level. The period of time that the Quote Resumption Event 36 is extended for is referred to as "Volatility Delay" 52. Monitoring time is increased by extending the time for the Quote Resumption Event 36 by the Volatility Delay, thus giving the market more time to absorb new market information. In this case, additional volatility detection is performed during the length of the Volatility Delay. The Volatility Delay also extends the time for the Trade Resumption 38. In some examples, when a Volatility Delay occurs, a Delay Notification is issued to market participants.

The length of the Volatility Delay depends on many factors such as whether volatility is detected in a halt or IPO issue and relative market volatility in comparable indices or related sectors. In some embodiments, the Volatility Delay for an IPO is five minutes, because the underwriting syndicate group requires time to ensure that the IPO issue is accurately priced. In some embodiments, the Volatility Delay for a halted security is one minute, because the pricing of a halted security is a reaction to market participants' supply and demand and is not dependent on an underwriting component. In some embodiments, the Volatility Delay is automatically machine generated based on market factors or in other embodiments it is set by an analyst examining market indices such the NASDAQ Composite, the Dow Jones Industrial Average, the Commodity Research Bureau Index and the Goldman Sachs Commodity Index to determine if market volatility has increased.

During a Volatility Delay, volatility is calculated using data points generated within the volatility delay or a mixture of datapoints, some from the Volatility Delay period and some from the prior Quotation Only Period 34. The volatility detection process described above is repeated, comparing calculation volatility to the threshold. After detection, trading is further delayed 54 if the volatility level still exceeds the threshold. Analogously, trading resumes 38 if the volatility level is below the threshold.

In some examples, no Volatility Delay occurs. For example, when the calculated volatility is below the threshold, trading resumes at the scheduled Trade Resumption 38 time and no extension in the Quote Resumption Event 36 or Trade Resumption 38 is triggered.

In some examples, the number of Volatility Delays is limited, ensuring that the security is eventually released. This limitation is referred to as the Maximum Volatility Sampler. A counter, referred to as the Volatility Sampler, tracks each occurrence of Volatility Detection 46. After every Volatility Detection 46, the value of the Volatility Sampler is incremented by one 48. After incrementing 48, the value of the Volatility Sampler is compared to the value of the Maximum Volatility Sampler 50. Once the Maximum Volatility Sampler 50 is reached, Trade Resumption 38 begins, even if volatility in the security's price quotations exceeds the threshold. However, if the value of the Volatility Sampler is less than the value of the Maximum Volatility Sampler 50 then both the Quotation Only Period 34 and Trade Resumption 38 are extended by the Volatility Delay 52, 54. In some examples, the value of the Maximum Volatility Sampler differs for an IPO issue and a halted security or based on the company underwriting the halted security or IPO issue. This is because different underwriters have varying sensitivities to volatility or perhaps volatility is less of a concern in certain industry sectors or is more problematic in an IPO issue situation than in a halted security situation.

Figure 5:
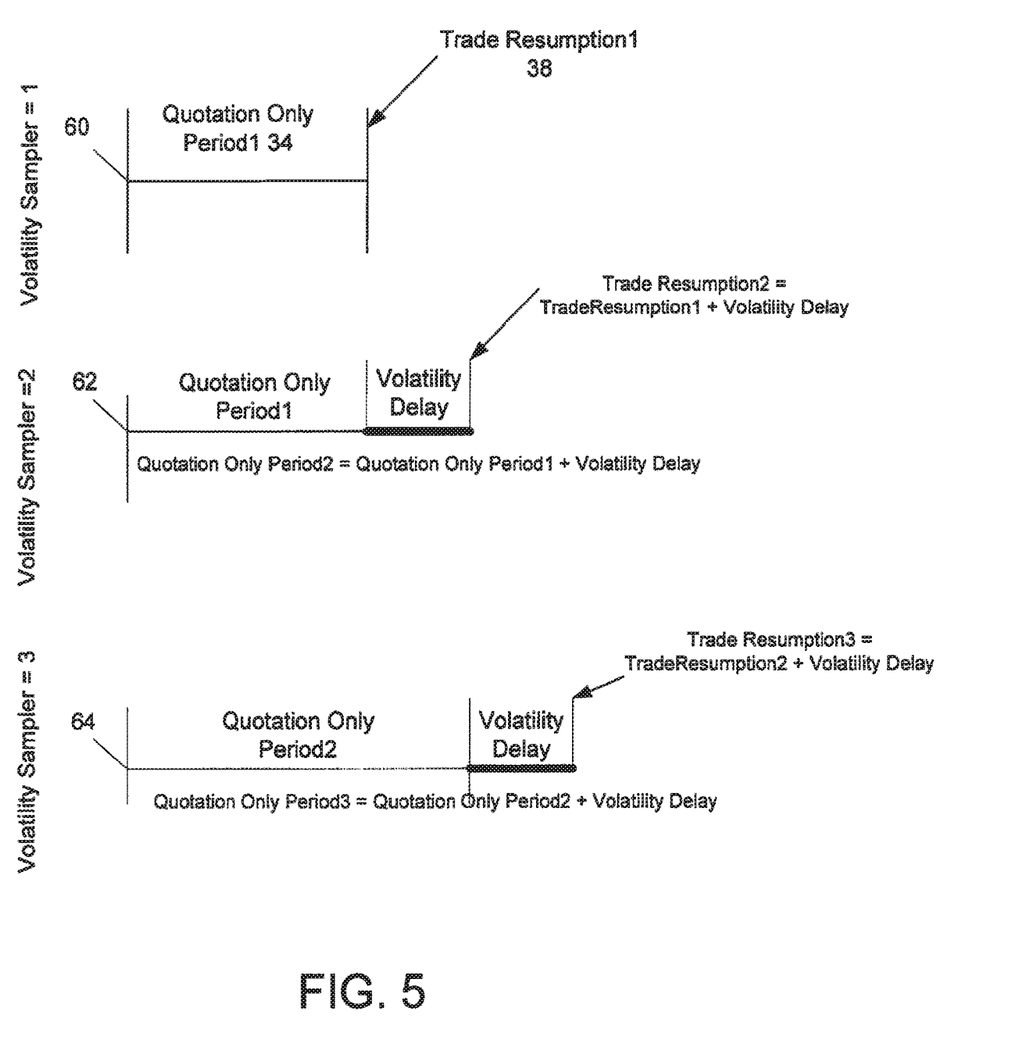
FIG. 5 is a block diagram of periods within the volatility detection process.

In one example, referring to FIG. 5, the value of the Volatility Sampler for an IPO issue is three. Therefore, volatility is sampled at most three times (60, 62, 64) before the IPO issue is released. After the initial Quotation Only Period 34 (Quotation Only Period 1), the price quotations of the IPO issue are sampled. If volatility of quotations for the IPO issue exceeds the threshold, then the Volatility Delay extends the Quotation Only Period 34, producing a new Quotation Only Period 2 and a new Trade Resumption 2. Concurrently, the value of the Volatility Sampler is incremented by one 48 to a value of one. Volatility detection is repeated at the end of the Quotation Only Period 2 62 and a second Volatility Delay occurs if volatility still exceeds the threshold. The second Volatility Delay extends the time of Quotation Only Period 2, producing a Quotation Only Period 3 64, and the value of the Volatility Sampler is incremented by one to a value of two. If volatility exceeds the threshold value at the end of the Quotation Only Period 3 64, the Volatility Sampler is incremented to a value of three, equaling the value of the Maximum Volatility Sampler. Therefore, after the third volatility detection cycle, volatility detection stops and trading resumes.

In some examples of a halted security, the value of the Maximum Volatility Sampler is two, allowing for two Volatility Detection Cycles. In some examples, the value of the Volatility Delay is one minute. Thus, if after the first cycle, detected volatility exceeds the threshold value, then the Volatility Sampler is incremented to a value of one and a Volatility Delay occurs. Therefore, at the end of the one minute Volatility Delay, volatility is again detected and the Volatility Sampler is incremented to a value of two. After this second cycle, if volatility still exceeds the threshold value, trading resumes, because volatility detection has occurred twice.

When the Quotation Only Period 34 ends, a Trade Resumption message is sent to market participants, notifying them of the opening of the IPO issue or halted security. To discourage gaming by market participants, the trade is executed at a random time point during a 15 second period following Trade Resumption. This ensures that market participants do not manipulate the security's price, such as by inflating it, immediately prior to trade execution, because market participants do not know when during the 15 second period the trade will actually execute. When the Trade Resumption notification has been sent, the system conducts the Halt Cross. The Halt Cross is the process for determining the price at which a security is executed at the open of trading for a halted security or an IPO issue.

The Halt Cross finds the price that maximizes the number of shares executed. If more than one price satisfies this condition, the price that minimizes the imbalance of shares unexecuted and does not leave unexecuted shares at a superior price is determined. If more than one price satisfies this condition also, the type of cross, such as an IPO or another halt, is determinative. For an IPO, if more than one price satisfies the above conditions, the price that minimizes the price differential from the Issuers Initial Public Offering price, found in the previous day's close field, is selected. For any other halt, if the security has already been opened for that day and more than one price satisfies the above conditions, the price that minimizes the price differential from the last Nasdaq market center execution prior to the halt is selected. If the security has not opened for that day and more than one such price satisfies the above conditions, the price that minimizes the price differential from the previous Closing Price is selected.

All orders are executed in strict price/time priority starting with the displayed quotation size and then the reserve quotation size at the most aggressive price level, and then moving to successive price levels. All executable orders are executed at the Halt Cross price. Orders and quotations subject to automatic execution participate in the Halt Cross.

For IPOs and other halts where a security has not previously opened during the trading day, the Halt Cross execution is reported to Nasdaq's trade reporting system with SIZE as the contra party on both sides of the trade, and then transmitted to the consolidated tape. SIZE is a special MPID (market participant identifier) that represents the aggregate size of all non-attributable quotes/orders at the best bid/best offer displayed in a quote montage (not shown) for the market/exchange or other trading venue along with the other MPIDs for quoting market participants that are also displaying attributable size at the inside price in the market/exchange or other trading venue The Halt Cross price and the associated paired volume are disseminated via the UTP Trade Data Feed ("UTDF") as a bulk print and on the Nasdaq Index Dissemination Service ("NIDS") and the Nasdaq Application Program Interface as the Nasdaq Official Opening Price ("NOOP"). For halts where a security has already opened during the trading day, the Halt Cross is reported as a single trade, but is not identified as a bulk print and is not disseminated as the NOOP. When the Halt Cross is complete, the execution functionality opens for regular trading.

Figure 6:
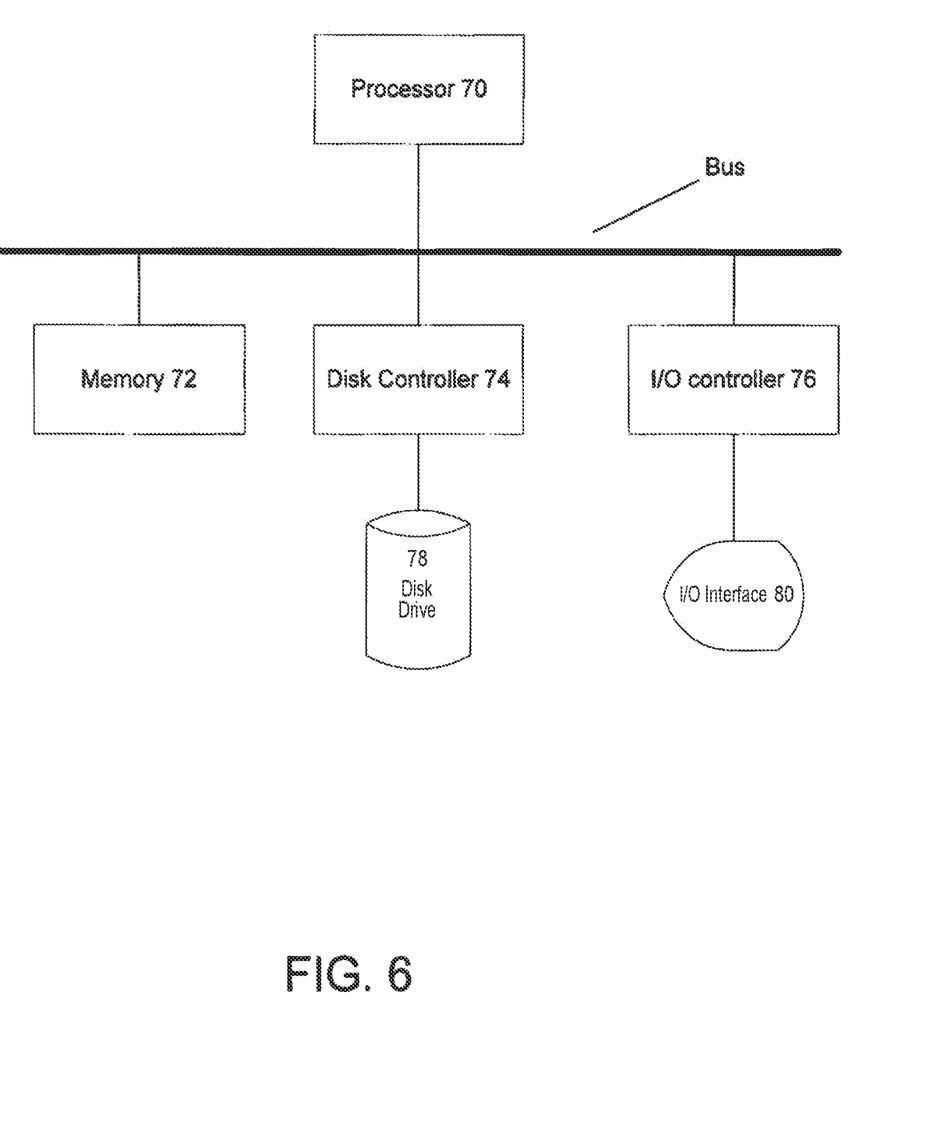
FIG. 6 is a diagram of a computing system that implements a method of detecting volatility.

Referring to FIG. 6, a computing system that implements volatility detection includes a processor 70, memory 72, disk controller 74 and an input/output (I/O) controller 76 all linked by a common bus. In some examples, the computing system also includes a disk drive 78, a monitor or other communication output device or interface 80 and a keyboard or other communication input device or interface 80.

A number of embodiments of the invention have been described. Nevertheless, it will be understood that various modifications may be made without departing from the spirit and scope of the invention. Accordingly, other embodiments are within the scope of the following claims. It is to be understood that using volatility detection as described herein occurs across different types of markets, such as securities, bonds, derivatives, futures, commodities markets and other financial markets.

The invention claimed is:

1. An electronic exchange system for processing electronic trading quote or order messages received from client computers electronically communicating with the electronic exchange system, comprising:
   a hardware processor; and
   a memory;
   wherein the hardware processor and the memory are configured to implement a matching data manager and a system state control data manager to perform operations that include:
   the matching data manager matching electronic trading quote or order messages based on trade matching parameters; and
   the system state control data manager imposing on the electronic exchange system a first system state having a first time period during which received electronic trading quote or order messages are not matched by the matching data manager;
   the matching data manager storing, during the first time period, the received electronic trading quote or order messages in memory for possible later matching by the matching data manager after the first time period ends;
   the system state control data manager:
   (i) determining a first electronic trading volatility data value based one of the trade matching parameters;
   (ii) determining a second electronic trading volatility data value based on the one trade matching parameter;
   (iii) calculating a volatility parameter of the one trade matching parameter based on a difference between the first electronic trading volatility data value and the second electronic trading volatility data value;
(iv) comparing the volatility parameter to a threshold value;
(v) extending the first time period of the first system state by a time delay when the volatility parameter equals or exceeds the threshold value; and
(vi) changing the electronic exchange system to a second system state after the first time period ends when the volatility parameter is less than the threshold value; and
the matching data manager, during the second system state, matching stored electronic trading quote or order messages for the one trade matching parameter.

2. The electronic exchange system in claim 1, wherein the time delay extends the first time period to a new time for changing the first system state to the second system state.

3. The electronic exchange system in claim 1, wherein the hardware processor and the memory are configured to implement the system state control data manager, when the first time period ends, to send a notification message to the client computers indicating the change to the second system state.

4. The electronic exchange system in claim 1, wherein the hardware processor and the memory are configured to implement the system state control data manager to repeat (i)-(v) up to a maximum number of times.

5. The electronic exchange system in claim 4, wherein the hardware processor and the memory are configured to implement the system state control data manager to change the first system state to a second system state after the maximum number of times is reached, even when the volatility parameter equals or exceeds the threshold value.

6. The electronic exchange system in claim 1, wherein the hardware processor and the memory are configured to implement the matching data manager to match stored electronic trading quote or order messages at a random time point after the first system state changes to the second system state.

7. The electronic exchange system in claim 1, wherein the matching of stored electronic trading quote or order messages during the second system state is at an opening price, and
wherein the hardware processor and the memory are configured to implement the matching data manager to calculate and set the opening price that maximizes a number of stored electronic trading quote or order messages that include the opening price.

8. The electronic exchange system in claim 1, wherein the matching of stored electronic trading quote or order messages during the second system state is at an opening price, and
wherein the hardware processor and the memory are configured to implement the matching data manager to calculate and set the opening price based on a type of trading transaction.

9. The electronic exchange system in claim 1, wherein the hardware processor and the memory are configured to implement the system state control data manager to determine the threshold value based on current conditions in the electronic exchange system.

10. The electronic exchange system in claim 1, wherein the hardware processor and the memory are configured to implement the system state control data manager to adjust the threshold value based on current conditions in the electronic exchange system.

11. A computer-implemented method for an electronic exchange system that includes a hardware processor and a memory configured to implement a matching data manager and a system state control data manager, the method comprising:
(a) receiving over a data communications network electronic trading quote or order messages from client computers electronically communicating with the electronic exchange system;
(b) imposing on the electronic exchange system, by the system state control data manager, a first system state having a first time period during which received electronic trading quote or order messages are not matched by the matching data manager;
(c) during the first time period, the matching data manager storing the received electronic trading quote or order messages in memory where they may be matched by the matching data manager after the first time period ends;
(d) determining, by the system state control data manager, a first electronic trading volatility data value based a trade matching parameter;
(e) determining, by the system state control data manager, a second electronic trading volatility data value based on the trade matching parameter;
(f) calculating, by the system state control data manager, a volatility parameter of the trade matching parameter based on a difference between the first electronic trading volatility data value and the second electronic trading volatility data value;
(g) comparing, by the system state control data manager, the volatility parameter to a threshold value;
(h) when the volatility parameter equals or exceeds the threshold value, the system state control data manager extending the first time period of the first system state by a time delay; and
(i) when the volatility parameter is less than the threshold value, the system state control data manager changing the electronic exchange system to a second system state after the first time period ends,
(j) wherein during the second system state, the matching data manager matching stored electronic trading quote or order messages for the trade matching parameter.

12. The method in claim 11, wherein the time delay extends the first time period to a new time for changing the first system state to the second system state.

13. The method in claim 11, wherein when the first time period ends, the system state control data manager sending a notification message to client computers indicating changing the electronic exchange system to the second system state.

14. The method in claim 11, further comprising repeating (d)-(h) up to a maximum number of times.

15. The method in claim 14, wherein after the maximum number of times is reached, the system state control data manager changing the first system state to a second system state even when the volatility parameter equals or exceeds the threshold value.

16. The method in claim 11, further comprising the matching data manager matching stored electronic trading quote or order messages at a random time point after the first system state changes to the second system state.

17. The method in claim 11, wherein matching of stored electronic trading quote or order messages during the second system state is at an opening price, the method further comprising the matching data manager calculating and setting the opening price that maximizes a number of stored electronic trading quote or order messages that include the opening price.

18. The method in claim 11, wherein matching of stored electronic trading quote or order messages during the second system state is at an opening price, the method further comprising the matching data manager calculating and setting the opening price based on a type of trading transaction.

19. The method in claim 11, further comprising the system state control data manager determining the threshold value based on current conditions in the electronic exchange system.

20. A computer program product embodied on a non-transitory, computer-readable medium storing a computer program which, when executed by a hardware processor and a memory configured to implement a matching data manager and a system state control data manager in an electronic exchange system, causes the electronic exchange system to process electronic trading quote or order messages by performing the following steps:
   (a) receiving over a data communications network electronic trading quote or order messages from client computers electronically communicating with the electronic exchange system;
   (b) imposing on the electronic exchange system, by the system state control data manager, a first system state having a first time period during which received electronic trading quote or order messages are not matched by the matching data manager;
   (c) during the first time period, the matching data manager storing the received electronic trading quote or order messages in memory where they may be matched by the matching data manager after the first time period ends;
   (d) determining, by the system state control data manager, a first electronic trading volatility data value based a trade matching parameter;
   (e) determining, by the system state control data manager, a second electronic trading volatility data value based on the trade matching parameter;
   (f) calculating, by the system state control data manager, a volatility parameter of the trade matching parameter based on a difference between the first electronic trading volatility data value and the second electronic trading volatility data value;
   (g) comparing, by the system state control data manager, the volatility parameter to a threshold value;
   (h) when the volatility parameter equals or exceeds the threshold value, the system state control data manager extending the first time period of the first system state by a time delay; and
   (i) when the volatility parameter is less than the threshold value, the system state control data manager changing the electronic exchange system to a second system state after the first time period ends,
   (j) wherein during the second system state, the matching data manager matching stored electronic trading quote or order messages for the trade matching parameter.

* * * * *